United States Patent [19]
de Gennes

[11] 3,905,655
[45] Sept. 16, 1975

[54] PRESSURE-MODULATION DEVICE APPLICABLE ESPECIALLY TO THE BRAKING CIRCUIT OF AN AUTOMOBILE VEHICLE AND A BRAKING CIRCUIT EQUIPPED WITH SAID DEVICE

[75] Inventor: Gerard de Gennes, Senlis, France

[73] Assignee: Societe Anonyme Francaise du Ferodo, Paris, France

[22] Filed: May 17, 1974

[21] Appl. No.: 470,731

[30] Foreign Application Priority Data
May 24, 1973  France ............................ 73.18900

[52] U.S. Cl. ............... 303/21 F; 137/599.2; 303/68
[51] Int. Cl.² ............................................. B60T 8/02
[58] Field of Search....... 303/21 F, 6 C, 6 R, 61–63, 303/68–69, 21 AF; 188/181 A, 349; 137/599.2

[56] References Cited
UNITED STATES PATENTS

| | | | |
|---|---|---|---|
| 3,463,556 | 8/1969 | Kersting | 303/6 C X |
| 3,533,441 | 10/1970 | Tischler | 137/599.2 X |
| 3,724,914 | 4/1973 | Skoyles | 303/21 F |
| 3,782,786 | 1/1974 | Matsumura | 303/21 F |
| 3,792,908 | 2/1974 | Brewster et al. | 303/21 F |
| 3,801,161 | 4/1974 | Sharp | 303/21 F |
| 3,836,207 | 9/1974 | Belart | 303/21 F |

Primary Examiner—Trygve M. Blix
Assistant Examiner—Douglas C. Butler
Attorney, Agent, or Firm—Young & Thompson

[57] ABSTRACT

A fluid-pressure-modulation device intended to be interposed between any hydraulic control and any receiver device, especially for the braking circuits of automobile vehicles, comprises essentially a first chamber connected to the control and a second chamber connected to the receiver. The chambers communicate with each other through a first passage controlled by a regulating valve which is normally closed, and also through a second passage formed axially in the regulating valve and controlled by an isolating valve which is normally open. The regulating and isolating valves form conjointly a valve unit which is movable in the first chamber and has a guiding tail slidably engaged in a fluid-tight manner in a bore coupled to the second chamber. The isolating valve is integrally housed in the regulating valve, and the guiding tail of the valve unit is carried by the regulating valve.

7 Claims, 10 Drawing Figures

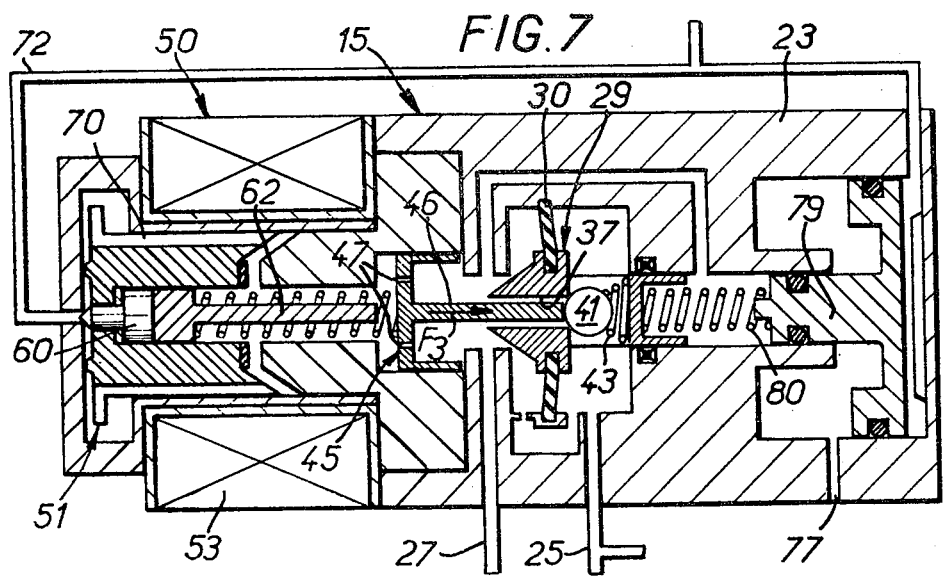
FIG.7
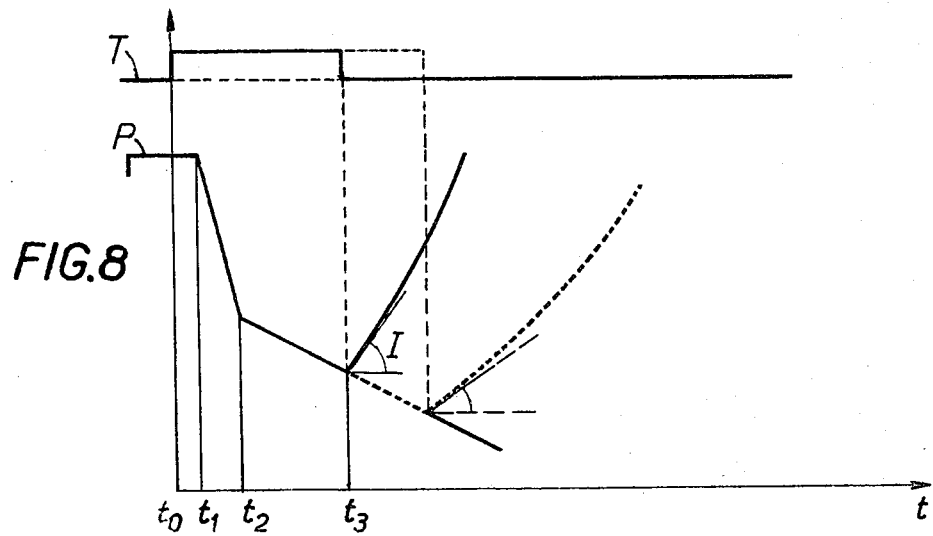
FIG.8
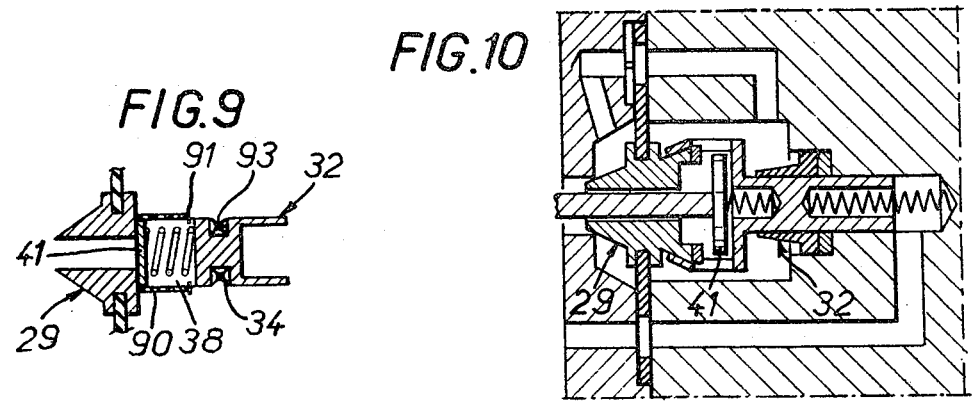
FIG.9
FIG.10

PRESSURE-MODULATION DEVICE APPLICABLE ESPECIALLY TO THE BRAKING CIRCUIT OF AN AUTOMOBILE VEHICLE AND A BRAKING CIRCUIT EQUIPPED WITH SAID DEVICE

The present invention is generally concerned with a modulation device intended to be interposed between any hydraulic control device and a receiver of any kind, and relates more particularly to the application of such a modulation device to the braking circuit of an automobile vehicle.

As is well known, the application of a too-powerful force on the brake pedal of an automobile vehicle may result in an undesirable locking of the wheels of this vehicle, from which moment the control of the said vehicle becomes particularly difficult.

In order to prevent this locking of the wheels of the vehicle, it has already been proposed to equip the braking circuit of this vehicle with a so-called "anti-locking" device, comprising a modulation device interposed on the one hand between the master cylinder or other hydraulic control of the braking circuit concerned, and one the other hand the braking receivers associated with the wheels of the vehicle, either for each of these wheels or for the wheels of a single axle, for a single axle only or for both.

A modulation device of this kind is servo-controlled by actuating means which are responsive to any one characteristic of the wheel or wheels to be supervised, speed for example, and control the utilization of the modulation device when, during braking, this characteristic reaches a critical value beyond which there appears a risk of locking of the wheel or wheels concerned.

In practice, when the critical conditions appear close to those corresponding to a locking of the wheels, the modulation device concerned must cause the pressure to fall in the receiver of the wheel or wheels concerned, and this must occur irrespective of the braking force applied by the driver of the vehicle on the brake pedal, and then must allow this pressure to rise in a controlled manner when these critical conditions have disappeared, while permitting an almost instantaneous return to the initial conditions as soon as the driver of the vehicle ceases to apply his action on the said brake pedal.

For this purpose, there has been proposed a modulation device comprising especially a first chamber connected to the hydraulic control, in the case concerned, to the master cylinder of the vehicle, and a second chamber connected to the receiver in question, in the case concerned a braking receiver, the said chambers being capable of communicating with each other, on the one hand through a first passage controlled by a regulation valve which is normally closed, and on the other hand through a second passage formed axially in the said regulating valve and controlled by an isolating valve which is normally open, the said valves being movable inside the said first chamber and the said isolating valve having a guiding tail slidably engaged in a fluid-tight manner in a bore connected to the said second chamber.

Through the isolating valve, which is normally held open by a needle valve controlled by a device responsive especially to an action of the associated control means, there is normally a direct connection between the first and second chambers and therefore between the master-cylinder and the brake receiver.

When, in consequence of an excessive force applied to the brake-pedal, the preessure in the chamber connected to the braking receiver increases in a dangerous manner, and when the control means then come into action, the needle-valve releases the isolating valve and this latter isolates the second chamber with respect to the first, and therefore separates the braking receiver from the master-cylinder, the said control means ensuring furthermore a drop of pressure in the said second chamber and therefore in the said receiver.

When the critical conditions liable to result in a locking of the wheel have then disappeared, the control means cease their action and the regulating valve is allowed to open in a moderate and controlled manner, which permits a gradual rise in pressure in the second chamber and therefore in the brake receiver.

When the driver of the vehicle ceases his action on the brake pedal, the needle-valve which controls the isolating valve immediately effects the re-opening of this latter.

It follows that the isolating valve must be capable of a large movement in order to permit a direct coupling without loss of pressure between the first and second chamber, while the regulating valve is only subjected to moderate displacements.

It is obviously desirable that the displacements of these valves are not hindered by any friction of any kind which would influence the accuracy of the unit in a disadvantageous manner.

Now, in the modulation device of the type already proposed as described above, the isolating valve is fitted into a housing formed in the regulating valve around an axial nozzle provided in this valve, the said nozzle forming the passage controlled by the isolating valve, and in order to ensure the fluid-tightness of the sliding movement of the guiding tail of the isolating valve in the bore in which it is engaged, this guiding tail is surrounded by a joint. This joint is therefore in contact with a device which is required to make large movements and the sealing joint applies a non-negligible gripping force on the guiding tail of the isolating valve, and since any displacement of the regulating valve causes a corresponding displacement of the isolating valve, due to the arrangement of these valves in series, the result is that the said fluid-tight joint hinders in an undesirable manner both the conditions of movement of the regulating valve and the conditions of movement of the isolating valve.

In addition, the various passages, bores and housings employed must be accurately centered, for ensuring correct operation of the whole unit, which imposes strict conditions of machining which are difficult to comply with.

Furthermore also, the regulating and isolating valves being mounted in series, the guiding of the first is only effected in an uncertain manner when the second is in the open position, and this latter is in all cases carried overhung by the guiding tail, which may cause a blockage.

The present invention has generally for its object an arrangement which enables these disadvantages to be overcome.

According to the invention, a modulation device intended to be interposed between any hydraulic control and any receiver, is of the kind comprising especially a first chamber connected to the said control and a second chamber connected to the said receiver, the said chambers being capable of communicating with each other, on the one hand through a first passage controlled by a normally closed regulating valve, and on the other hand through a second passage formed axially in the said regulating valve and controlled by a normally open isolating valve, the said valves forming conjointly a valve unit which is movable inside the said first chamber and has a guiding tail slidably engaged in a fluid-tight manner in a bore coupled to the said second chamber, and is characterized in that the isolating valve is wholly housed in the regulating valve, and in that this regulating valve carries the guiding tail of the unit.

Thus, the guiding tail, which is rigidly fixed to the regulating valve, is subjected only to small displacements and for that reason the conditions of displacement of the said valves are only slightly affected by the clamping force of the joint, which may advantageously be of the lip type, this joint then working in fact under good conditions, that is to say without movement, by simple deformation, and this lip joint applying therefore no undesirable reactions on the conditions of movement of the regulating valve.

In addition, in spite of the clamping force which it applies on the guiding tail, this fluid-tight joint has no influence on the movement of the isolating valve, which can open and close with large displacements, in an almost instantaneous manner.

Furthermore, there is constantly a good centering of this valve unit which, on the one hand is held at the front by a deformable diaphragm fixed to the regulating valve and which, on the other hand, is guided at the rear by the guiding tail. by a swivel-joint effect between the said deformable diaphragm and the said joint, there is in fact a self-centering action of this valve unit, and therefore, the concentricity of the bores, passages and housings required is no longer critical.

The characteristic features and advantages of the invention will furthermore be brought out in the description which follows below, given by way of example, reference being made to the accompanying diagrammatic drawings, in which:

FIGS. 3 to 7 are views similar to that of FIG. 2, for various successive phases of operation of this modulation device;

FIG. 8 is a diagram illustrating this operation;

FIGS. 9 and 10 are partial views similar to FIG. 2, and each is respectively concerned with an alternative form of construction.

FIG. 1 illustrates the application of the invention to a braking circuit of an automobile vehicle.

Figure 1:
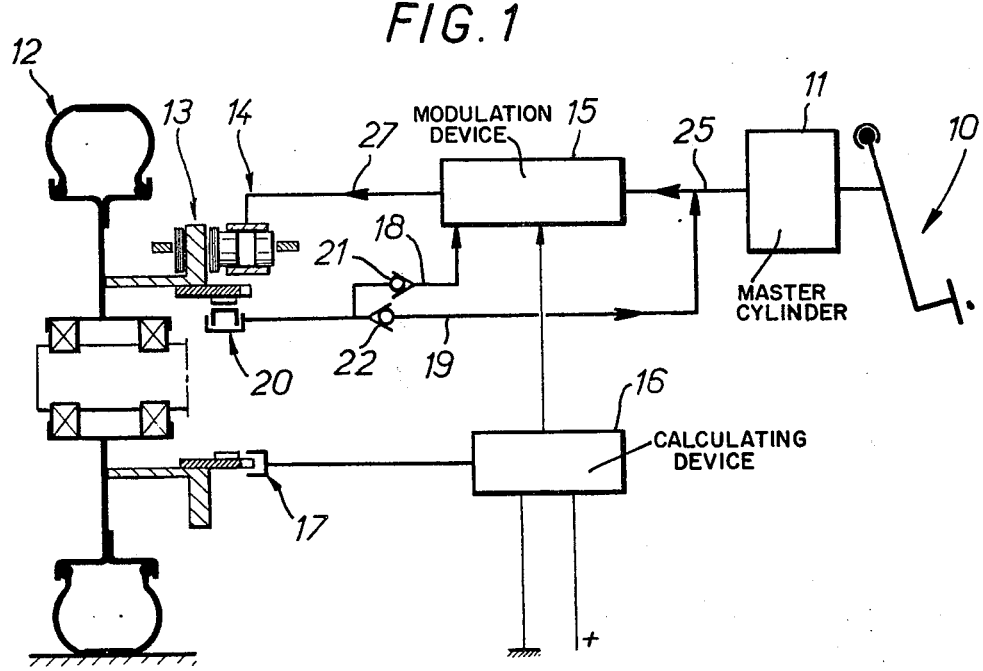
FIG. 1 is a block diagram of a braking unit equipped with a modulation device according to the invention.

in this FIG. 1, there has been shown diagrammatically at 10 the brake pedal of this vehicle, at 11 the master-cylinder which it controls, at 12 one of the wheels of the vehicle, at 13 a member to be braked, fixed for rotation with this wheel, and at 14 the braking receiver associated with this member.

In known manner, a modulation device 15 is interposed between the master-cylinder 11 and the braking receiver 14, and this modulation device 15 is controlled by a calculating device 16, controlled in turn by a speed detector 17 responsive to the angular speed of the wheel 12.

In practice, the modulation device 15 is connected to the master-cylinder 11 by a conduit 25 and to the braking receiver 14 by a conduit 27.

A circulation of fluid is ensured in the modulation device 15 by conduits 18, 19 which are connected to a pump 20 driven by the wheel 12, and which each comprise a non-return valve 21, 22 respectively. in the example shown, the conduit 19 is a branch connection on the conduit 25.

The modulation device 15 comprises a body 23 composed of various elements assembled together in a suitable manner, which it is unnecessary to described in detail.

In the centre of this body, a first chamber 24 is formed which is capable of being connected to a master-cylinder 11.

With this first chamber 24 there is associated a second chamber 26 which is capable of being connected to the braking receiver 14 through the conduit 27.

These two chambers 24 and 26 are capable of communicating with each other through a first passage 28 having a section S.

This passage 28 is controlled by a clapper-valve 29 hereinafter known as the regulating valve.

This regulating valve 29 is movably mounted in the chamber 24 and is fixed at its periphery to a flexible diaphragm 30 which in practice divides the chamber 24 into two volumes, namely a first volume 24A which is in direct connection with the conduit 25, and second volume 24B which is in connection with the previous volume by a calibrated nozzle 31.

The regulating valve 29 is furthermore fixed to a guiding tail 32 which is slidably engaged in a fluid-tight manner inside a bore 33 of the body 23.

This bore 33 is formed in the extension of the passage 28 and has the same section S as this latter.

The guiding tail 32 is surrounded by a sealing joint 34 which, in the example shown in FIGS. 2 to 7, is arranged in a groove 35 formed for that purpose in the body 23.

The chambers 24 and 26 are also able to communicate with each other through a second passage 37 formed axially in the regulating valve 29 and opening, behind this valve, into a recess 38 formed in the guiding tail 32, this recess 38 having a bottom wall 40 facing the second passage 37.

The recess 38 of the guiding tail 32 serves as a housing for a clapper-valve 41 adapted to close the second passage 37 and urged for that purpose towards this latter by a spring 43 which is supported against the bottom wall 40 of the said recess.

In the example shown in FIGS. 2 to 7, this second valve 41, known hereinafter as the isolating valve, is constituted by a simple ball.

The isolating valve 41 is actuated by a piston 45 which carries for that purpose a finger 46 engaged in the passage 37, the said piston being slidably mounted in a bore 42 of the body 23.

In practice, the chamber 26 is defined by the piston 45 and the regulating valve 29, and it communicates by a passage 44 with the bore 33 in which slides the guiding tail 32, to the rear of this latter.

The piston 45 is provided with a plurality of calibrated passages 47.

The bore 42 in which it slides is extended by a bore 48 formed partly in the yoke 49 if an electro-magnetic control device 50, and partly in the armature 51 of this device, this armature 51 being movably mounted in the body 23 and forming with the associated yoke 49 an air-gap 52 which is conical in the example shown.

The electro-magnetic control device 50 further comprises an operating coil 53 which surrounds the yoke 49 and the armature 51.

The aramature 51 is movably mounted against the action of a spring 55 which is supported against a shoulder 56 of the body 23 and urges it in the direction of the front corresponding wall 57 of the body.

In addition, this armature 51 is provided at its periphery with longitudinal grooves 58 so as to permit the passage of fluid.

The coil 53 of the electro-magnetic control device 50 is connected to the calculating device 16 shown above.

In the bore 48, and more precisely in the portion of this bore which is formed in the yoke 49, a piston 60 is movably mounted.

A spring 61 is provided between this piston 60 and the piston 45 previously described.

On that of its faces which is opposite to the piston 45, the piston 60 carries a rod 62, against which the piston 45 can come into abutment.

On its opposite face, the piston 60 carries a needle-valve 63 which passes through the armature 51 and is intended to close a passage 64 formed in the front wall 57 of the body 23.

The bore 48 which extends the bore 42, in which the piston 45 slides, forms in practice with the portion of the bore 42 which is in front of the piston 45, the longitudinal groove 58 of the armature 51 and the recess in which this latter moves behind the front wall 57 of the body 23, an intermediate chamber 70.

Through the passage 64 formed in the front wall of the body 23, and through a conduit 72 connected to this passage, the intermediate chamber 70 is capable of being connected to an accumulation chamber 73 formed at the other extremity of the body 23, between the corresponding front wall 74 of this body and a piston 75 movably mounted inside a bore 76 which is connected to the atmosphere through a passage 77.

The front wall 74 of the body 23 is provided with a boss 78 for making contact with the piston 75.

On its face opposite to this boss 78, the piston 75 carries a tail 79 slidably engaged in a fluid-tight manner in the bore 33 in which there is already engaged the guiding tail 32 of the valve unit formed conjointly by the regulating valve 29 and the isolating valve 41.

A spring 80 is mounted between this guiding tail 32 and the tail 79 of the piston 75.

On the conduit 72 there is branched the conduit 18 which, comprising a non-return valve 21, connects the modulation device 15 to the pump 20. The associated conduit 19 which comprises the non-return valve 22 is established between this pump 20 and the conduit 25 connecting the modulating device 15 to the master-cylinder 11.

Figure 2:
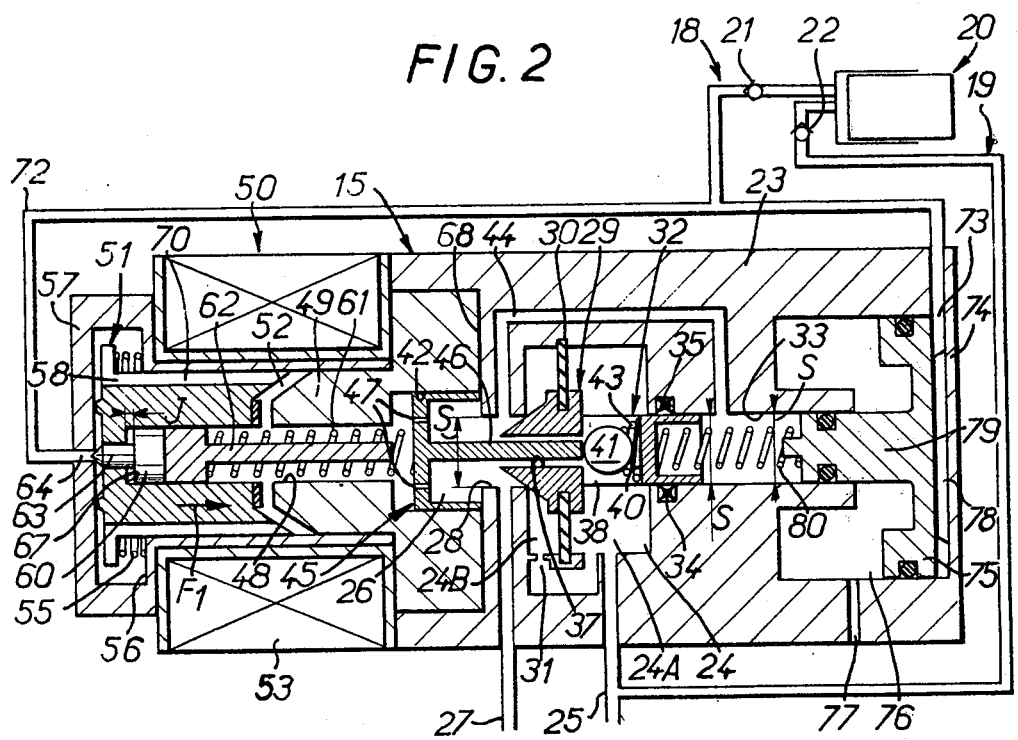
FIG. 2 is a diagrammatic view in axial section of this modulation device.

In the position of rest as shown in FIG. 2, the armature 51 is supported against the front wall 57 of the body 23 under the action of its spring 55. Due to the urging action of the spring 61, the needle-valve 63 closes the passage 64 which it controls, and a clearance J exists between the piston 60 and a shoulder 67 of the armature 51.

Under the urging action of this same spring 61, the piston 45 is supported against a shoulder 68 of the body 23. Under the action of the spring 80, the regulating valve 29 closes the passage 28; under the action of this same spring 80, the piston 75 is in contact with the boss 78 on the front wall 74 of the body 23, and owing to the finger 46 carried by the piston 45, the isolating valve 41 is in the open position.

For this reason, the same pressure exists in the chambers 24, 26 and 70, and in particular the two faces of the piston 45 are subjected to the same pressure.

If an action is applied on the brake pedal 10, the equality of the pressures in the first chamber 24 and the second chamber 26 continues normally, the isolating valve 41 being fully open.

Thus, the effect of the force applied on the brake pedal 10 is wholly applied to the braking receiver 14.

If the slowing-down which results for the wheel 12 becomes too accentuated, to the point at which this wheel is on the point of becoming locked during the course of braking, before the stopping of the vehicle, the calculating device 16 effects the application of a pre-determined voltage T to the coil 53 of the electro-magnetic control device 50, following a process which does not form part of the present invention and will therefore not be described here.

Figure 3:
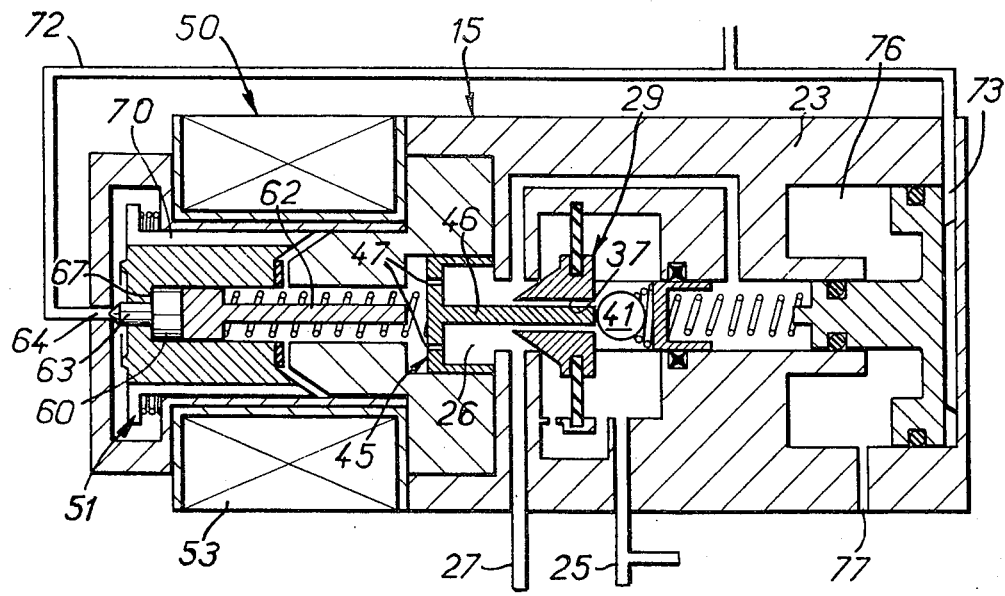
Figure 4:
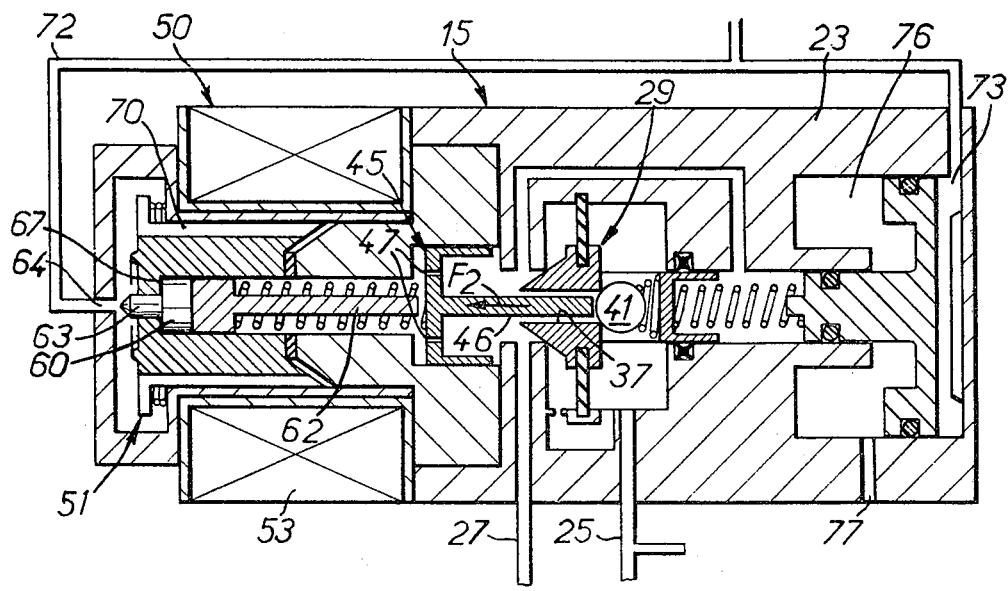

Due to this voltage T, the armature 51 is displaced in the direction of the arrow $F_1$ of FIG. 1, and after a dead travel corresponding to the absorption of the clearance J, its shoulder 67 comes into contact with the piston 60 (see FIG. 3) which causes the operation of this piston and therefore the liberation by the needlevalve 63 of the passage 64, causing the intermediate chamber 70 to communicate with the accumulation chamber 73 (see FIG. 4).

Due to the liberation of this passage 64 and to the high pressure existing until then in the chamber 26 and the intermediate chamber 70, there is a leakage of fluid from the intermediate chamber 70 towards the accumulation chamber 73, and therefore from the chamber 26 towards the intermediate chamber 70.

Due to this leakage of fluid and to the existence of the calibrated passages 47 of the piston 45 causing the chamber 26 to communicate with the intermediate chamber 70, the pressure in this latter chamber falls to a valve lower than the pressure in the chamber 26.

The two faces of the piston 45 are then no longer subjected to the same pressure, and this piston is moved in the opposite direction to the armature 51, in the direction of the arrow $F_2$ of FIG. 4.

In consequence, the finger 46 carried by this piston 45 loses contact with the isolating valve 41 and this latter is urged by its spring 43 in order to close the passage 37.

The regulating valve 29 being furthermore also in the closed position, the chamber 26 becomes isolated from then on from the chamber 24, and in consequence, the pressure in the chamber 24 can increase under the effect of the action applied on the brake pedal 10, without the pressure in the chamber 26 being thereby modified; the braking receiver 14 is isolated from the master-cylinder 11.

On the contrary however, due to the fact of the leakage of fluid referred to above, and due to the backward movement of the piston 45, the pressure in the chamber 26 falls abruptly, this backward movement of the piston 45 being furthermore accentuated by the elastic return of the receiver 14 towards its normal condition of rest, following the elastic deformation to which it has been subjected, due to the excessive pressure which has been applied to it.

Figure 5:
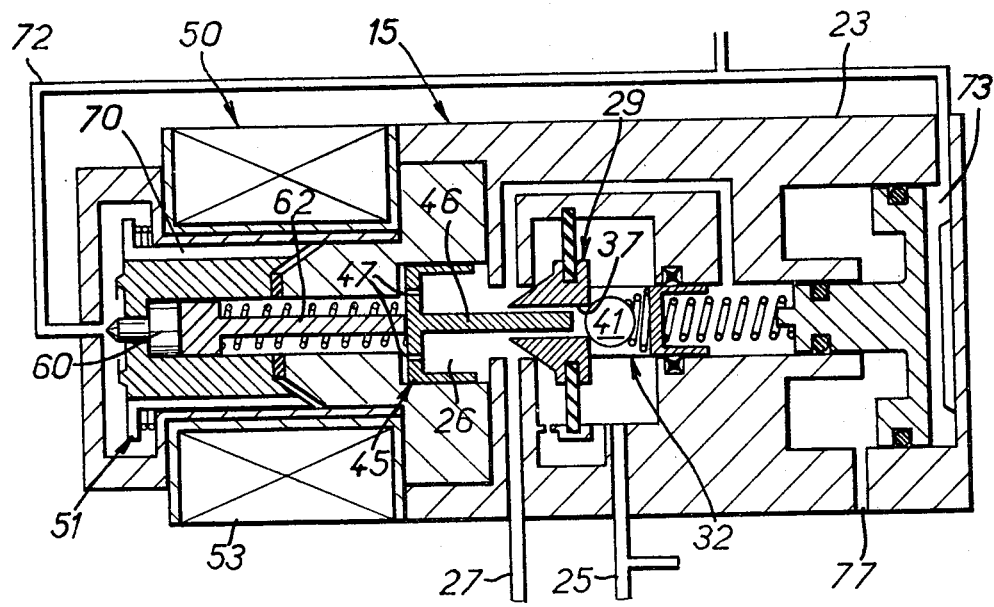
Figure 6:
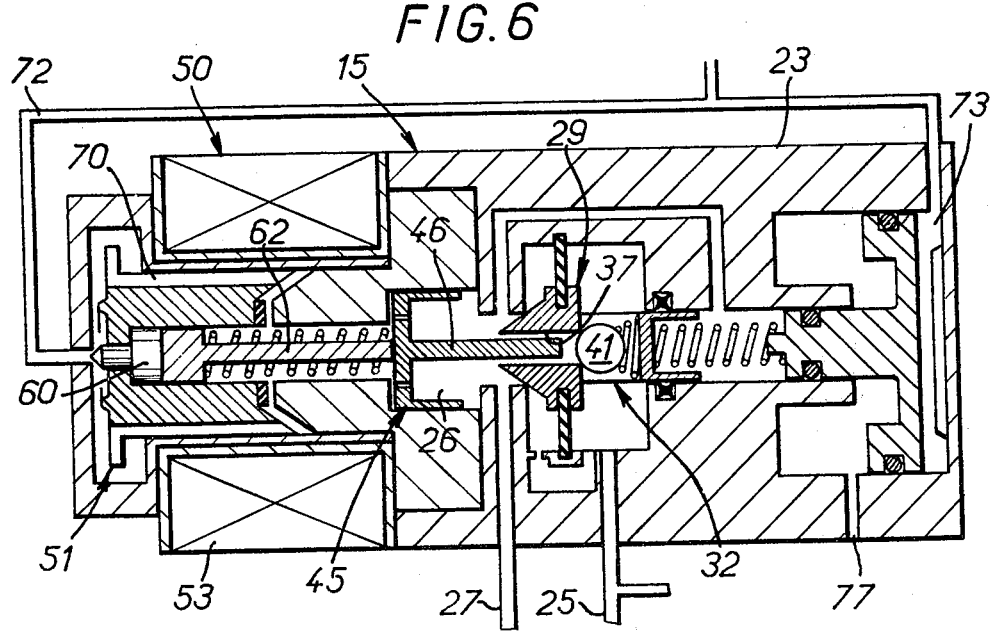

The abrupt fall in pressure in the chamber 26 continues until the piston 45 again comes into contact with the rod 62 carried by the piston 60 (see FIG. 5).

A new phase begins, during the course of which the armature 51, the piston 60, its rod 62 and the piston 45 conjointly form a mobile unit fixed together and subjected on the one hand, and in a first direction, to the magnetic force developed by the coil 53 of the electromagnetic control device 50, and on the other hand to the differential pressure applied to the piston 45.

The result is that, pushed back by the action of the piston 45, the needle-valve 63 slightly re-closes the passage 64 (see FIG. 6) which slows-down the leakage of fluid through this passage, and therefore slows-down the fall of pressure in the chamber 26.

In this way, there is established an equilibrium between the forces applied to the unit constituted by the armature 51, the piston 60, its rod 62 and the piston 45, as explained above, and to this equilibrium there will correspond a regulated fall in pressure in the chamber 26.

This phase of the operation continues umtil the voltage T is no longer applied to the coil 53 of the electromagnetic control device 50 (see FIG. 7) under the action of the calculating device 16.

The armature 51 returns immediately to its initial position under the action of its spring 55 and by the action of the spring 61, and the needle-valve 63 which was close to the outlet of the passage 64, instantaneously closes this latter passage.

As the piston 45 is no longer subjected to differential pressures, the spring 61 pushes it back in the direction of the arrow $F_3$ of FIG. 7, and the finger 46 carried by this piston 45 again comes into contact with the isolating valve 41.

This valve 41 is however closed under the effect of its spring 43 and especially of the differences in pressure existing in the chambers 24 and 26, while the regulating valve 29 is only urged in turn into the closed position by the single spring 80, the hydraulic forces acting on this regulating valve 29 in the chamber 24 becoming balanced due to the equality of the sections of passage 28 in which the valve 29 is engaged, and the section of the bore 33 in which is engaged the guiding tail 32 carried by this valve.

By construction, the spring 80 is chosen to be stronger than the spring 43. The isolating valve 41 remains in the closed position and forms a mobile unit together with the regulating valve 29. The finger 46 of the piston 45 thus pushes back the regulating valve 29 through the intermediary of the isolating valve 41.

The chamber 26 is then in communication with the chamber 24, or more precisely with the valume 24B of this chamber, so that the pressure in the chamber 26 gradually rises under the control, on the one hand of the calibrated nozzle 31 which causes the volumes 24A, 24B of the chamber 24 to communicate with each other, and on the other hand, of the spring 80 which has been more or less compressed, depending on the quantity of fluid previously transferred through the passage 64 and the conduit 72 from the intermediate chamber 70 to the accumulation chamber 73.

As previously for the needle-valve 63, the regulating valve 29 takes up a position of equilibrium as a function of the only elastic forces to which it is subjected, due to the springs 61 and 80, as explained above, and the rise in pressure which results in the chamber 26 is advantageously independent of the pressure in the chamber 24, and is essentially a function of the quantity of fluid extracted in the brake.

This phase of operation continues until the isolating valve 41 is again actuated to opening by the finger 46 of the piston 45.

Such actuation to opening is instantaneous if the depression force applied on the brake pedal 10 is released.

These various phases of operation are shown in the diagram of FIG. 8, which represents in abscissae the time t and in ordinates, on the one hand the pressure P in the chamber 26, that is to say in the barking reciever 14, and on the other hand the voltage T at the terminals of the coil 53 of the electro-magnetic control device 50.

The instant origin $t_0$ on this diagram corresponds to the beginning of the intervention of the electromagnetic control device 50.

The pressure P in the chamber 26 has a value which is maintained up to a time $t_1$ marking the liberation of the passage 64 by the needle-valve 63 under the action of the armature 51 (see FIG. 3).

The pressure P then falls abruptly up to the instant $t_2$ which marks the contact of the piston 45 with the rod 62 of the piston 60 (see FIG. 5).

The fall in pressure then continues, but at a much slower rate, up to the instant $t_3$ which marks the cessation of the action of the armature 51 (see FIG. 7).

As described above, there is then a controlled rise in pressure following a slope I which is all the greater if the intervention of the magnetic control device has been short.

In fact, the shorter this intervention is, the less liquid is transferred from the intermediate chamber 70 to the accumulation chamber 73, the spring 80 is compressed to a lesser degree and the opening of the regulating valve 29 is greater.

There has been shown in full lines in FIG. 8 a short intervention of the electro-magnetic control device 50, and in broken lines a prolonged intervention of this device.

Conjointly with the procedure described above, tha pump 20 ensures the return of the fluid from the chamber 73 towards the master-cylinder 11.

It will be understood that if, during the course of the rise in pressure, the conditions again become such that they correspond to locking of the wheel, a procedure similar to that described above is again initiated.

In accordance with the alternative form of construction illustrated by FIG. 9, the isolating valve 41 is a disc and the recess 38 in which it is housed is surrounded by a perforated cage 90 engaged on the guiding tail 32 and held on this latter by a circlip 91.

This perforated cage 90 ensures a correct holding and appropriate guiding of the valve 41.

According to this same alternative form, the joint 34 associated with the guiding tail 32 is arranged in a groove 83 formed in this tail.

According to the alternative form of construction shown in FIG. 10, the isolating valve 41 is a washer, and this washer is movably mounted inside a perforated guiding hood which is fixed and for example inset on the regulating valve 29, and which carries the guiding tail 32.

It will be understood that in all cases, the guiding tail 32 which is coupled to the regulating valve 29 is not required to make large movements and in consequence, the joint 34 can easily be a lip joint which then works under good conditions.

There will also be appreciated the self-centering capacity by swivel-jointing of the valve assembly formed conjointly by the regulating valve 29 and the isolating valve 41, this swivel jointing being effected around the joint 34, taking account of the capacity for deformation of the flexible diaphragm 30 coupled to the regulating valve 29.

Finally, it will be appreciated that the valve 41 can pass very rapidly into the open position with a substantial displacement which is in no way disturbed by any joint or other friction member.

It will be understood that the present invention is not restricted to the forms of embodiment described and illustrated, but includes any alternative form of construction and/or combination of their various parts.

What we claim is:

1. A modulating device for interposition between a hydraulic control and a receiver, comprising a first chamber adapted to be connected to said control, a second chamber adapted to be connected to said receiver, said chambers communicating with each other through a first passage, a normally closed regulating valve member controlling said first passage, said chambers also communicating with each other through a second passage which is disposed axially in said regulating valve member, a normally open isolating valve member controlling said second passage, and a guiding tail carried by said regulating valve member and slidably engaged in a fluid-tight manner in a bore connected to said second chamber to the rear of said guiding tail, said isolating valve member being housed in a recess which is integral with said regulating valve member and into which said second passage opens.

2. A modulation device as claimed in claim 1, in which said recess is formed in said guiding tail and communicates with said first chamber.

3. A modulation device as claimed in claim 2, in which said recess is surrounded by a perforated cage for the maintenance and guiding of said isolating valve member.

4. A modulation device as claimed in claim 1, in which, facing said second passage, said recess includes a bottom wall on which are supported elastic means urging said isolating valve member in the direction of said second passage.

5. A modulation device as claimed in claim 1, in which said recess is formed between the regulating valve member and a hood which is fixed to said regulating valve member, and which carries said guiding tail.

6. A modulation device as claimed in claim 1, in which said regulating valve member is fixed to a flexible diaphragm.

7. An automotive vehicle braking circuit having a modulation device as claimed in claim 1.

* * * * *